Figure 1:
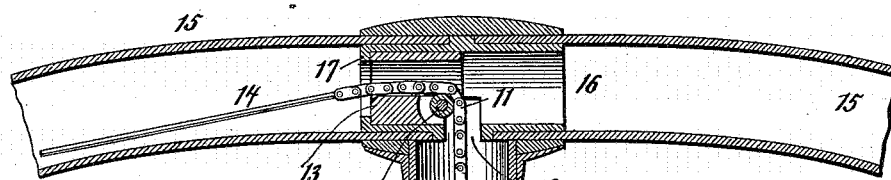

(No Model.)

E. S. LEAYCRAFT.
BICYCLE BRAKE.

No. 601,349. Patented Mar. 29, 1898.

WITNESSES:
O. N. Hayward
Ernest Hopkinson

INVENTOR
Edwin S. Leaycraft
BY Edwin H. Brown
his ATTORNEY

THE NORRIS PETERS CO., PHOTO-LITHO., WASHINGTON, D. C.

UNITED STATES PATENT OFFICE.

EDWIN S. LEAYCRAFT, OF JERSEY CITY, NEW JERSEY.

BICYCLE-BRAKE.

SPECIFICATION forming part of Letters Patent No. 601,349, dated March 29, 1898.

Application filed June 26, 1897. Serial No. 642,525. (No model.)

*To all whom it may concern:*

Be it known that I, EDWIN S. LEAYCRAFT, of Jersey City, Hudson county, and State of New Jersey, have invented a certain new and useful Improvement in Bicycle-Brakes, of which the following is a specification.

The present invention relates to brakes for bicycles and similar vehicles, and has for its object to provide an improved form of brake adapted to bear upon the sides of a pneumatic tire.

In the drawings I have illustrated a construction embodying my invention, in which—

Figure 2:
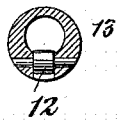
Figure 3:
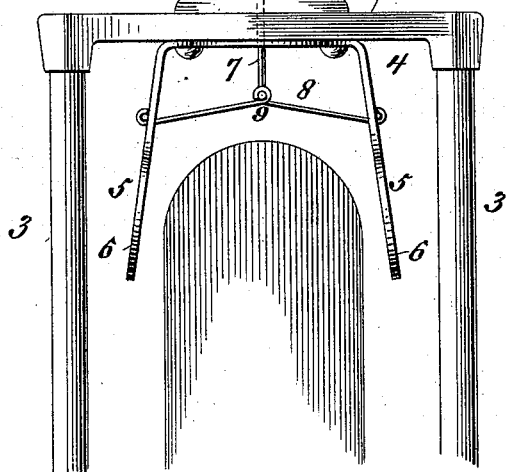
Figure 3:
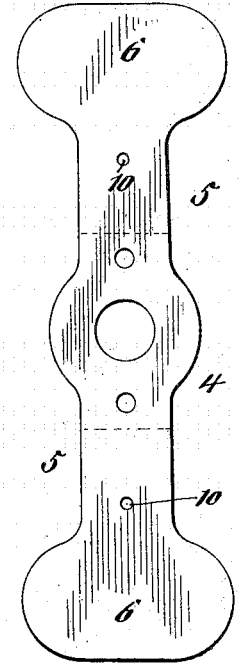

Figure 1 is a front elevation of the steering-post and part of the fork of a bicycle, partly in section. Fig. 2 is a detail sectional view of the bearing-block, and Fig. 3 is a detail plan view of the brake-shoe before the same is bent to shape.

Referring to the drawings in detail, 1 represents a steering-post secured upon the cross-bar 2, connecting the posts 3, constituting the front fork of the wheel.

4 designates the brake-shoe, which is preferably made out of a single strip of spring metal secured to the under side of the bar 2 by any preferred means, as by screws.

5 5 designate the downwardly-projecting portions of the brake-shoe, having laterally-extended bearing-pieces 6, adapted to bear upon the sides of a pneumatic tire. A rod 7 passes down the center of the steering-post, and its lower end is connected to the downwardly-extending side pieces 5 by means of a toggle connection 8, which in the present instance is shown as consisting of a single piece of wire having a central eye 9, to which the rod 7 is secured, the ends of the toggle connection passing through apertures 10, formed in the brake sides 5, and bent over upon the outside thereof. The upper end of the rod 7 is connected to a chain 11, passing over a roller 12, journaled in the block 13. The chain passes through this block and is connected to a rod 14, which is connected with any suitable form of operating-handle. The block 13 is of cylindrical form and seated so as to be capable of moving axially relatively to the handle-bars 15.

16 designates a socket-piece provided at one end with a flange 17, against which the block 13 abuts. The socket-piece 16 also receives the ends of the handle-bars and is provided with a cut-out portion 18, through which the chain 11 passes.

It will be seen that by this form of brake the bearing portions 6 of the shoe act upon the sides of the tire with a pinching action and do not have the effect of injuriously bearing upon the tread portion thereof.

What is claimed as new is—

1. In combination with a bicycle, a brake therefor, said brake consisting of a single piece of metal, secured at points intermediate its length to the frame of the bicycle, and bent to have its ends projected so as to embrace the sides of the wheel, and means in connection with said projected portions to cause them to bear against the sides of the wheel, substantially as described.

2. A brake for bicycles and similar vehicles consisting of a single strip of spring metal bent so as to have downwardly-projecting bearing portions, a connection between the two downwardly-projecting bearing portions and means secured to said connection for moving the bearing portions toward each other to effect a braking action upon the wheel-tire, substantially as specified.

3. A brake for bicycles and similar vehicles consisting of a single strip of spring metal bent so as to have downwardly-projecting bearing portions, means secured to said connection for moving the bearing portions toward each other to effect a braking action upon the wheel-tire, and an axially-movable roller-bearing block over which the brake-actuating chain passes, substantially as specified.

In testimony whereof I have signed my name to this specification in the presence of two subscribing witnesses.

EDWIN S. LEAYCRAFT.

Witnesses:
ERNEST HOPKINSON,
W. LAIRD GOLDSBOROUGH.